E. CHAMBERLIN.
Vehicle-Springs.
No. 6,611. Reissued Aug. 24, 1875.
Fig. 1.
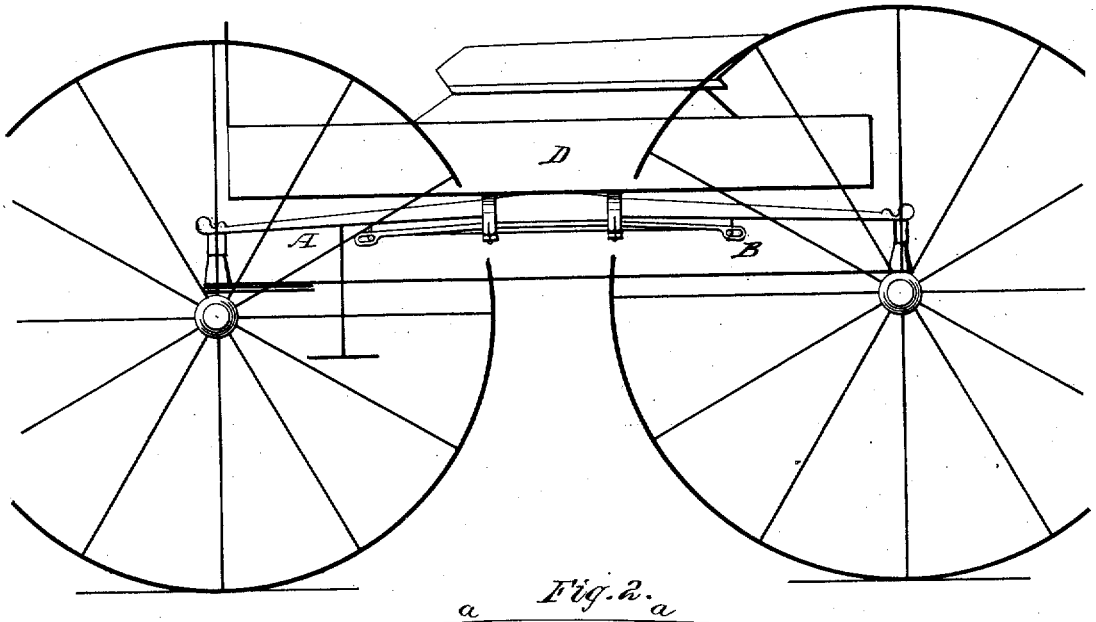
Fig. 2.
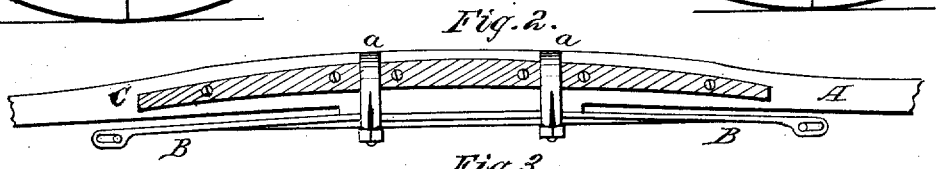
Fig. 3.
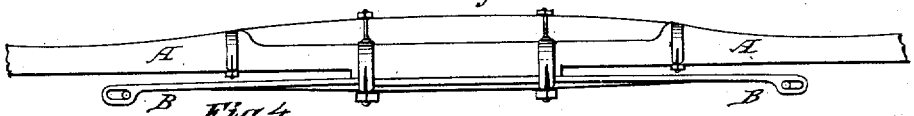
Fig. 4.
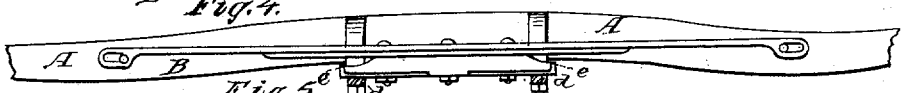
Fig. 5.
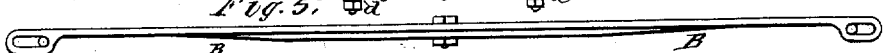
Fig. 6.
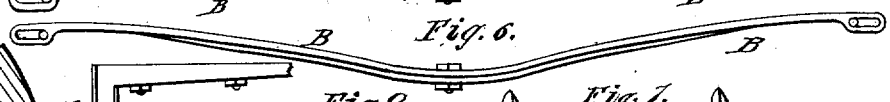
Fig. 8.
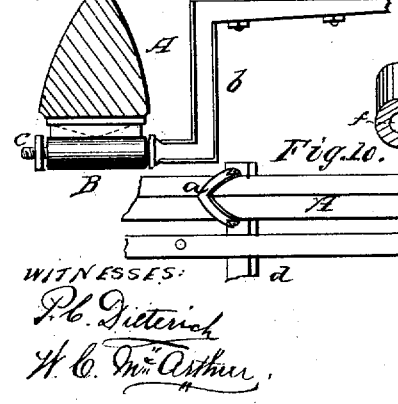
Fig. 9.
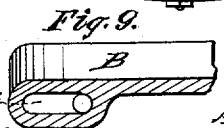
Fig. 10.
Fig. 7.
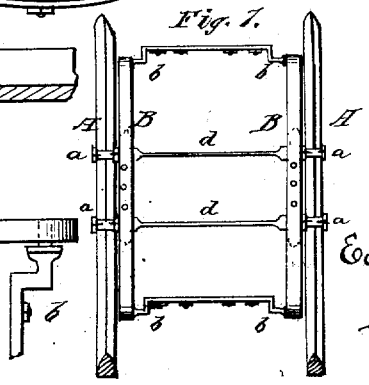
WITNESSES:
P. C. Dieterich
H. C. McArthur
INVENTOR:
Edwin Chamberlin
per
C. H. Watson & Co
ATTORNEYS.
N. PETERS, PHOTO-LITHOGRAPHER, WASHINGTON, D. C.

UNITED STATES PATENT OFFICE.

EDWIN CHAMBERLIN, OF TROY, NEW YORK, ASSIGNOR TO HIMSELF, LEE CHAMBERLIN, AND EDWARD CHAMBERLIN, OF SAME PLACE.

IMPROVEMENT IN VEHICLE-SPRINGS.

Specification forming part of Letters Patent No. 151,274, dated May 26, 1874; reissue No. 6,611, dated August 24, 1875; application filed July 26, 1875.

*To all whom it may concern:*

Be it known that I, EDWIN CHAMBERLIN, of Troy, in the county of Rensselaer and State of New York, have invented certain new and useful Improvements in Springs for Vehicles; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My invention relates to hanging side-bar buggy-bodies; and it consists in increasing the elasticity and ease of riding of side-bar buggies by hanging the body, by certain pivots and slats, to springs that are placed or secured inside or under and parallel to the side bars, as more fully hereinafter set forth.

In the annexed drawing, Figure 1 is a general view of a buggy-body, D, hung with my improvements. Fig. 2 is a view of the side bar A, provided with plate C, inserted in and secured to the side by clips *a*, or other well-known means. Fig. 3 shows the springs B secured to the bar A in a modified form. Fig. 4 shows the spring B hung inside of the bars A. Figs. 5 and 6 are views of the spring B. Fig. 7 is a plan view of the spring B, hung parallel to and inside of the side bars A. Fig. 8 is a transverse view of the bar A, and shows the loop *b* joined to the end of the spring B by the pivot *c*. Fig. 9 is an enlarged view of the end of the spring B, showing the elongated eye *f*. Fig. 10 is a view of the side bar A, and part of the bar *d* and spring B, with the loop *b* in the end thereof.

The construction of side-bar buggies has been such that ease of riding and elasticity have been sacrified to lightness and compactness of form over the ordinary end-spring buggy.

The objects of this invention are secured by placing half-springs B parallel to and under or inside of the side bars A, and using them in combination for hanging the body D. The springs B are secured under the side bars A by any well-known means, or are hung inside the side bars A by one or more bars, *d*, Figs. 7 and 10. Running under the body D, and attached at either end to the side bars A, upon these bars *d*, Fig. 4, a block, *e*, is placed, upon which the spring B rests and is secured. The bars *d* extend, in the form of lugs, under the block *e*, and receive the bolts or clips with which the springs may be attached, so as to strengthen the parts at that place. The bars *d* may be one or more, as may be necessary to steady the bars A, and provide means for hanging the springs B to form a connection with the body D. The springs B are provided with elongated eyes *f* in either or both ends, that receive the pivot *c* on the end of the body-loop *b*, which is bolted fast to the body. The springs B move on the pivots *c* during all the movements of the carriage, both in a circular and longitudinal direction. As the greatest strain comes on the side bar A it is strengthened by the plate *c*, let into the wood on the inside of the bar, as shown in Fig. 2, or attached to the side of the bar, as shown in Fig. 3.

By this arrangement of springs, bars, and body-loops for hanging buggy-bodies, the body is hung low, rendering the carriage compact, and giving great elasticity, and the springs are connected to the side bars to form a center bearing for the springs, while the body is attached to the springs at or near their ends. By this means all weight bears directly on the center of the springs, and the body has four points of bearing on the springs, whereby the body is held more perfectly balanced should the weight in the wagon happen to be more upon one side than on the other.

The spring may be made any length, and attached directly to the body by the pivot *c* and loop *b*, or any well-known means. The bars A are attached at their ends to the running parts, as is usual in side-bar buggies.

Having thus fully described my invention, what I claim as new, and desire to secure by Letters Patent, is—

1. The side bars A and springs B, in combination with transverse bars *d*, forming a center bearing for the springs B, substantially as herein set forth.

2. The side bars A, cross-bars *d*, and springs B, either beneath or inside the side bars, in combination with the body D, the springs being connected to the side bars to form a center bearing for the springs, and the body being connected to the springs near their ends, substantially as and for the purposes herein set forth.

3. The body-loops *b*, provided with pivots *c*, in combination with springs B and bars A and *d*, substantially as and for the purpose set forth.

4. The plate C, in combination with the bar A, substantially as and for the purpose set forth.

In testimony that I claim the foregoing I have hereunto set my hand this 24th day of July, 1875.

EDWIN CHAMBERLIN.

Witnesses:
JOSEPH NORWOOD,
JOHN W. MCPHERSON.